United States Patent
Persels et al.

(10) Patent No.: US 7,065,547 B2
(45) Date of Patent: Jun. 20, 2006

(54) INTEGRATED ON-LINE SYSTEM WITH ENCHANCED DATA TRANSFER PROTOCOL

(76) Inventors: Conrad G. Persels, 12001 Black Berry Ter., Potomac, MD (US) 20878; Greg Pringle, 11608 Doxdam Ter., Germantown, MD (US) 20879

( * ) Notice: Subject to any disclaimer, the term of this patent is extended or adjusted under 35 U.S.C. 154(b) by 1219 days.

(21) Appl. No.: 09/801,854

(22) Filed: Mar. 9, 2001

(65) Prior Publication Data

US 2001/0037464 A1    Nov. 1, 2001

Related U.S. Application Data

(60) Provisional application No. 60/187,986, filed on Mar. 9, 2000.

(51) Int. Cl.
*G06F 15/16* (2006.01)
(52) U.S. Cl. .................. 709/200; 709/217; 709/219; 713/182; 713/189; 713/160; 726/5
(58) Field of Classification Search .............. 709/206, 709/217, 227, 218, 244, 200, 219; 705/26; 713/182, 189, 160; 707/200
See application file for complete search history.

(56) References Cited

U.S. PATENT DOCUMENTS

| | | |
|---|---|---|
| 5,742,763 A | 4/1998 | Jones |
| 5,805,823 A | 9/1998 | Seitz |
| 5,838,910 A | 11/1998 | Domenikos et al. |
| 5,844,969 A | 12/1998 | Goldman et al. |
| 5,940,070 A | 8/1999 | Koo |
| 5,944,783 A * | 8/1999 | Nieten ................. 709/202 |
| 5,948,054 A | 9/1999 | Nielsen |
| 5,987,513 A | 11/1999 | Prithviraj et al. |
| 6,145,001 A * | 11/2000 | Scholl et al. ............. 709/223 |
| 6,578,075 B1 * | 6/2003 | Nieminen et al. ......... 709/221 |
| 2003/0139975 A1 * | 7/2003 | Perkowski ................ 705/26 |

FOREIGN PATENT DOCUMENTS

WO    WO98/21668    5/1998

\* cited by examiner

*Primary Examiner*—Frantz B. Jean
(74) *Attorney, Agent, or Firm*—Richard C. Litman

(57) ABSTRACT

The integrated on-line system with enhanced data transfer protocol enables dissimilar computers to instantly interchange data and integrate applications over a transfer control protocol/internet protocol (TCP/IP) network. The system is based on a client-server architecture in which multiple clients exchange data through a data transfer server using the enhanced data transfer protocol. The server acts as a post office for transferring data and provides verification of the sender's identity, the receiver's identity, verification of data transfers, electronic mailbox facilities, an audit trail, and inquiry and reporting functions. The protocol implements a socket to socket data interchange protocol on a preassigned port. Communications require validation of a header and permit send and receive sessions, receive sessions, or and end to end session. Optionally, the system provides a dual key encryption system, including a header key and a data encryption key.

18 Claims, 14 Drawing Sheets

INTEGRATED ON-LINE SYSTEM WITH ENCHANCED DATA TRANSFER PROTOCOL

CROSS-REFERENCE TO RELATED APPLICATION

This application claims the benefit of U.S. Provisional Patent Application Ser. No. 60/187,986, filed Mar. 9, 2000.

BACKGROUND OF THE INVENTION

1. Field of the Invention

The present invention relates generally to a data transfer system and, more specifically, to an on-line system with an enhanced data transfer protocol for providing data transfer and confirmation of the transfer between clients through an enterprise server.

2. Description of Related Art

The quickening pace of business is putting greater and greater time pressure on business-to-business communications. Bill Gates describes this accelerating trend in his latest book *Business @ the Speed of Thought*. Yet a fundamental facility is missing. There is no universal facility enabling business processes on different computers, operated by different companies, to interchange and process data instantly. The traditional 3rd party electronic data interchange (EDI) mailbox approach to business-to-business communications introduces a time delay that is counter to this trend. In an attempt to minimize mailbox dwell time, trade partners are forced to repeatedly dial their mailboxes to deposit and receive data. This is wasteful in both time and resources for both the trading partners and the 3rd party mailbox provider. Furthermore, current mailbox services are difficult to integrate with existing applications.

An alternative to 3rd party mailboxing has been for a company to set up its own communications, normally dial up, requiring its trading partners to adhere to whatever communications standards the company has adopted. This approach is expensive to create, expensive to maintain and it is so restrictive to potential trading partners that many may not have the resources to comply.

More recently, companies are implementing systems using Internet e-mail and/or FTP. This approach addresses the mailbox dwell time problem. However, the use of these Internet facilities introduces problems in security, reliability, delivery confirmation and application integration. It's not enough to deliver data quickly. The delivery facility must also provide security, instant delivery confirmation, and a means for seamless application integration.

Below are several known inventions that are illustrative of state-of-the-art systems for data transfer. U.S. Pat. No. 5,742,763, issued on Apr. 21, 1998 to Mark Alan Jones, describes a universal message delivery system for client-server-client communication that optimally assembles messages being transmitted between clients.

U.S. Pat. No. 5,805,823, issued Sep. 8, 1998 to G. Seitz, shows a system and method which provide a messaging architecture for real time, asynchronous data exchange and request handling by multiple client applications in a network. The message architecture uses multiplexed aggregation of messages being sent to client applications, thereby maximizing network efficiency and reducing bandwidth requirements.

U.S. Pat. No. 5,838,910, issued on Nov. 17, 1998 to Steven D. Domenikos et al., describes systems and processes that allow a computer to connect to a server on an Internet site for executing an application program that is stored on a disk linked to that server. Specifically, processes are disclosed that provide a data transport interface for connecting to the server, transport from the server a server address signal representative of a network address of the server, and a path name signal representative of a file system that includes an application program.

U.S. Pat. No. 5,844,969, issued on Dec. 1, 1998 to Shelley B. Goldman et al., describes a communication system, method and device for remotely re-transmitting received electronic mail directed to a destination terminal to a new destination terminal.

U.S. Pat. No. 5,940,070, issued on Aug. 17, 1999 to Ja-goun Koo, describes a device and method for retransmitting an audio signal using a video signal line in a computer system.

U.S. Pat. No. 5,944,783, issued on Aug. 31, 1999 to Joseph Lee Nieten, describes an apparatus and method for data transfers through software agents using client-to-server and peer-to-peer transfers. The apparatus and method are used for information transfer among software agents operating simultaneously on a digital network.

U.S. Pat. No. 5,948,054, issued on Sep. 7, 1999 to Jakob Nielsen, describes a method and system for facilitating the exchange of information between human users in a networked computer system. In a networked computer system including a customer computer associated with a human customer, one or more consultant computers associated with one or more human consultants, and a server computer, the human customer sends an information request to the server via the customer computer.

U.S. Pat. No. 5,987,513, issued on Nov. 16, 1999 to Narayanan Prithviraj et al., describes a network management system which enables a user to manage a network using browsers available on remote computer systems.

International Publication No. 9,821,668, published on May 22, 1998 describes a method and system for managing a complex network of interconnected devices.

None of the above inventions and patents, taken either singly or in combination, is seen to describe the instant invention as claimed.

SUMMARY OF THE INVENTION

The integrated on-line system with enhanced data transfer protocol enables dissimilar computers to instantly interchange data and integrate applications over a transfer control protocol/internet protocol (TCP/IP) network. The system is based on a client-server architecture in which multiple clients exchange data through a data transfer server using the enhanced data transfer protocol. The server acts as a post office for transferring data and provides verification of the sender's identity, the receiver's identity, verification of data transfers, electronic mailbox facilities, an audit trail, and inquiry and reporting functions. The protocol implements a socket to socket data interchange protocol on a preassigned port. Communications require validation of a header and permit send and receive sessions, receive sessions, or an end-to-end session. optionally, the system provides a dual key encryption system, including a header key and a data encryption key.

Each of the clients is connected to the network for enabling each client to communicate with the server. Each client has a small Java software program for sending and receiving electronic information through the system. Each client has an electronic mailbox ID and password which are included in a header prefacing the message or data transfer and which serve to identify the client for the purpose of sending and receiving data transfers.

When the client initiates a data transfer, the server immediately acknowledges receipt of the data. If the receiving client is currently listening to the server, the server notifies the receiving client that a message is pending, and when the receiving client acknowledges the server, the data is transferred instantly. If the receiving client is not currently listening, the server retains the data until the receiving client contacts the server and requests delivery. In any event, when the data is transferred, the exchange is recorded in the server's relational database, which may be queried through a web server by the sending client to verify delivery of the data.

The system may optionally include an encryption method to further assure security of the data transfer. The encryption method includes a first encryption key which encrypts the header prefacing the data transfer to identify the sender and to encrypt header data. The header data includes a second encryption key, which is used to encrypt the message data and which is sent to the receiving client so that the data may be decoded.

Accordingly, it is a principal object of the invention to provide an integrated on-line system capable of data interchange which is platform independent so that it may be integrated with client applications on dissimilar machines.

It is another object of the invention to provide an integrated on-line system having a purpose-built transfer protocol capable of serving as a communications logic for enabling instant interchange of data between a client and a server via a TCP/IP network.

It is further an object of the invention to provide a system and method for data transfer using an enhanced data transfer protocol that incorporates a dual key encryption method for secure transfer of data over a TCP/IP network.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
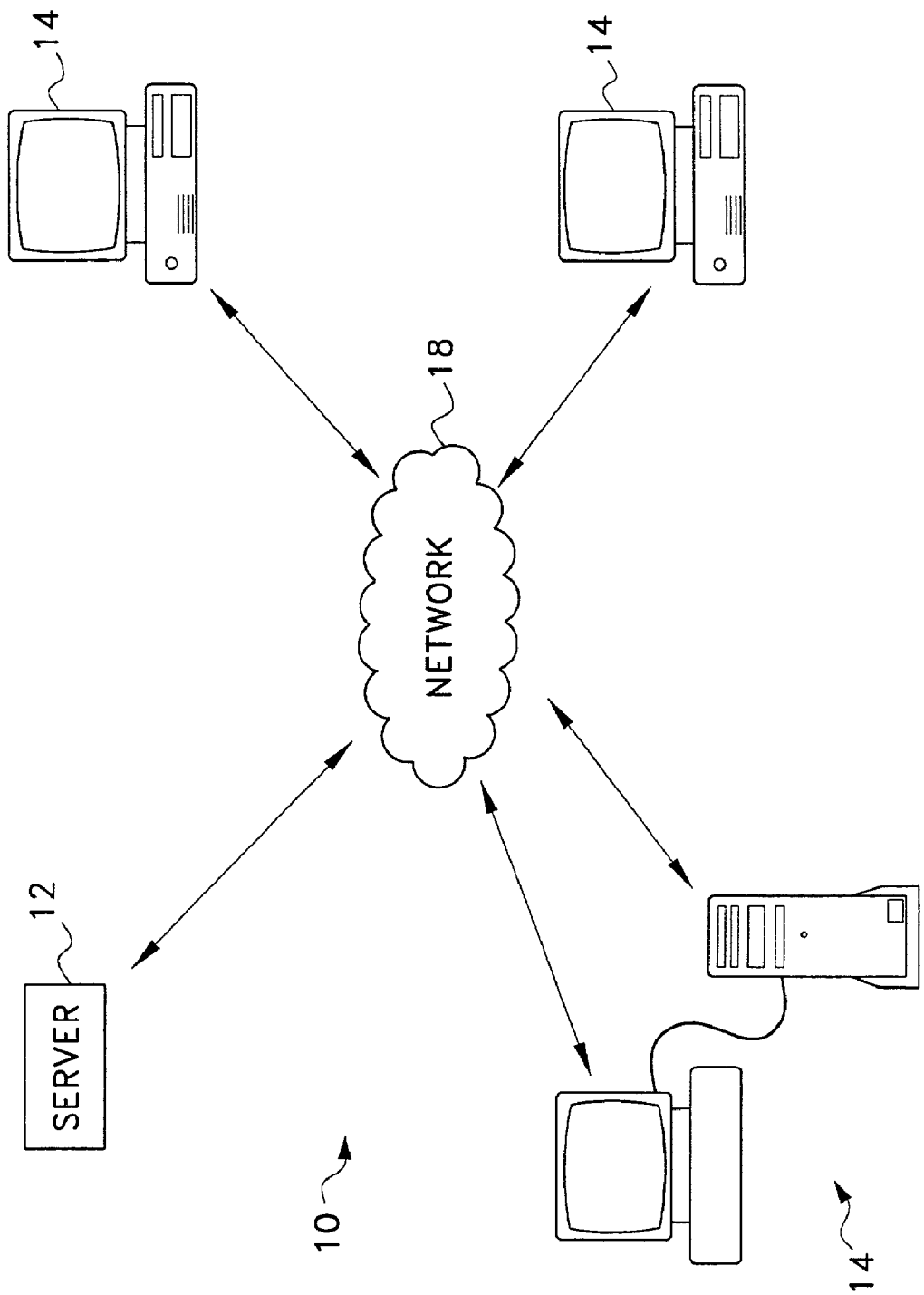
FIG. 1 is a generic network-based system for enabling dissimilar computers to interchange data and integrate applications according to the present invention.
Figure 3:
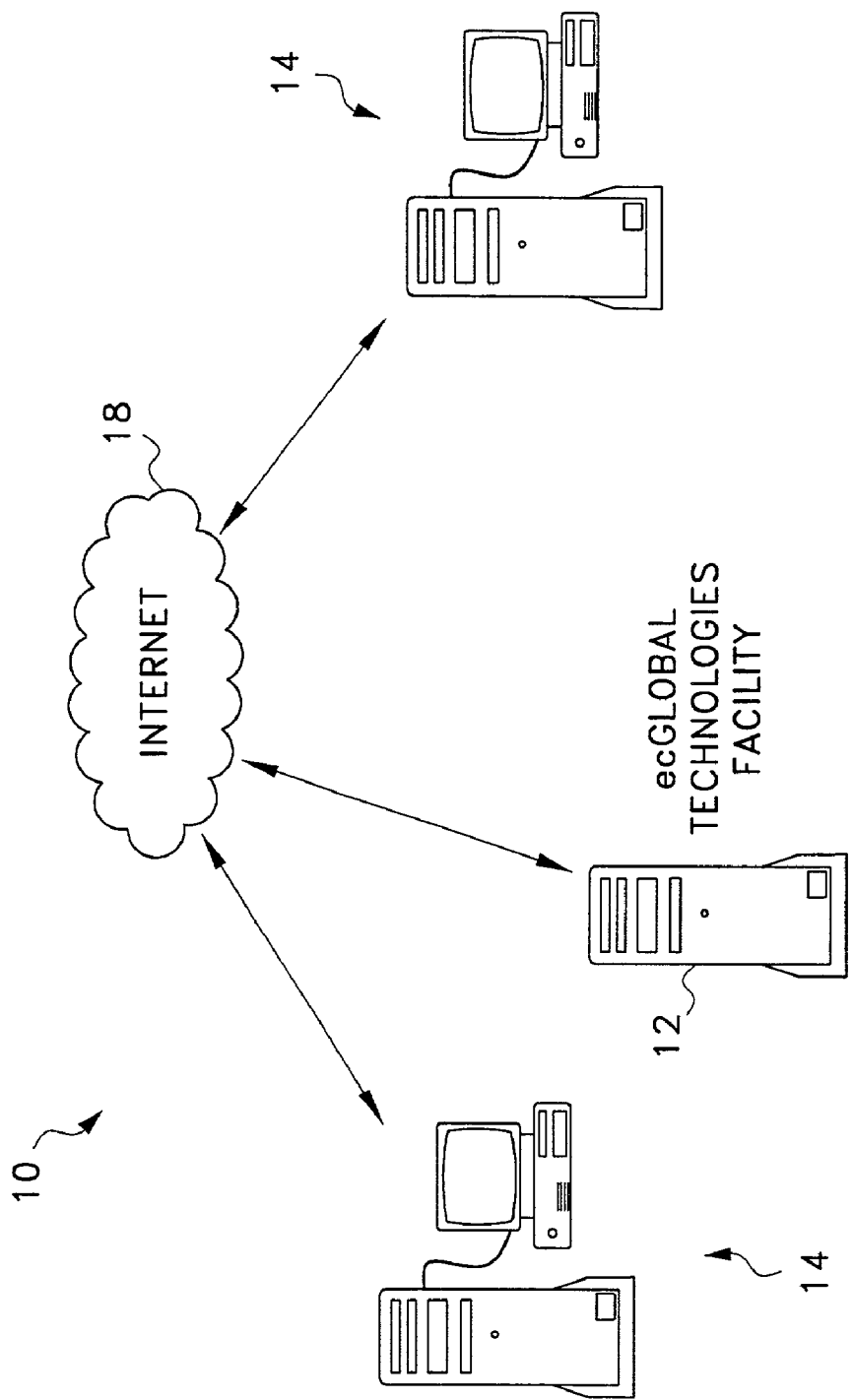
FIG. 3 is a block diagram of a global on-line system for providing communication services according to the present invention.
Figure 4:
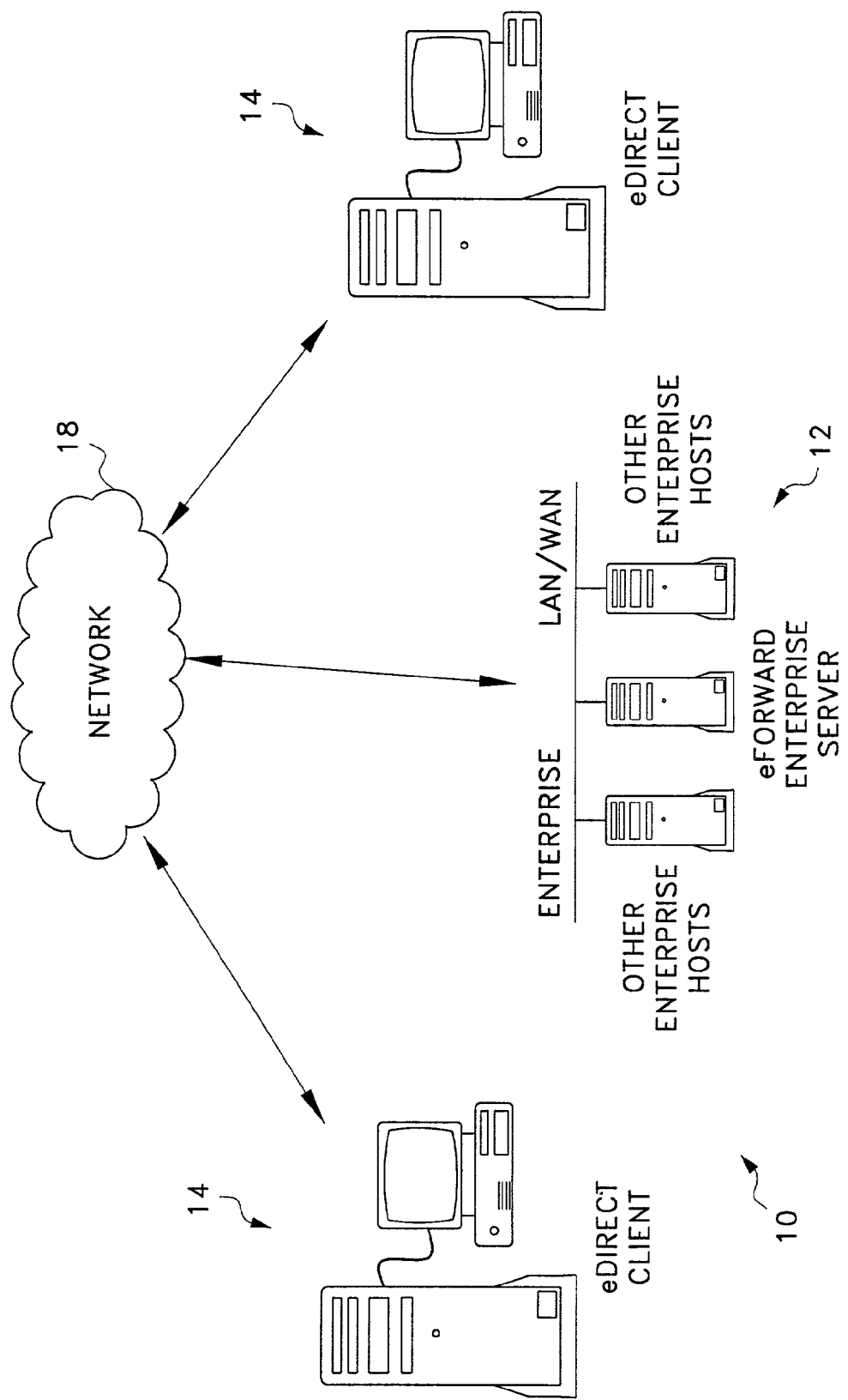
FIG. 4 is a block diagram of a network-based system for providing communication services according to the present invention.
Figure 5A:
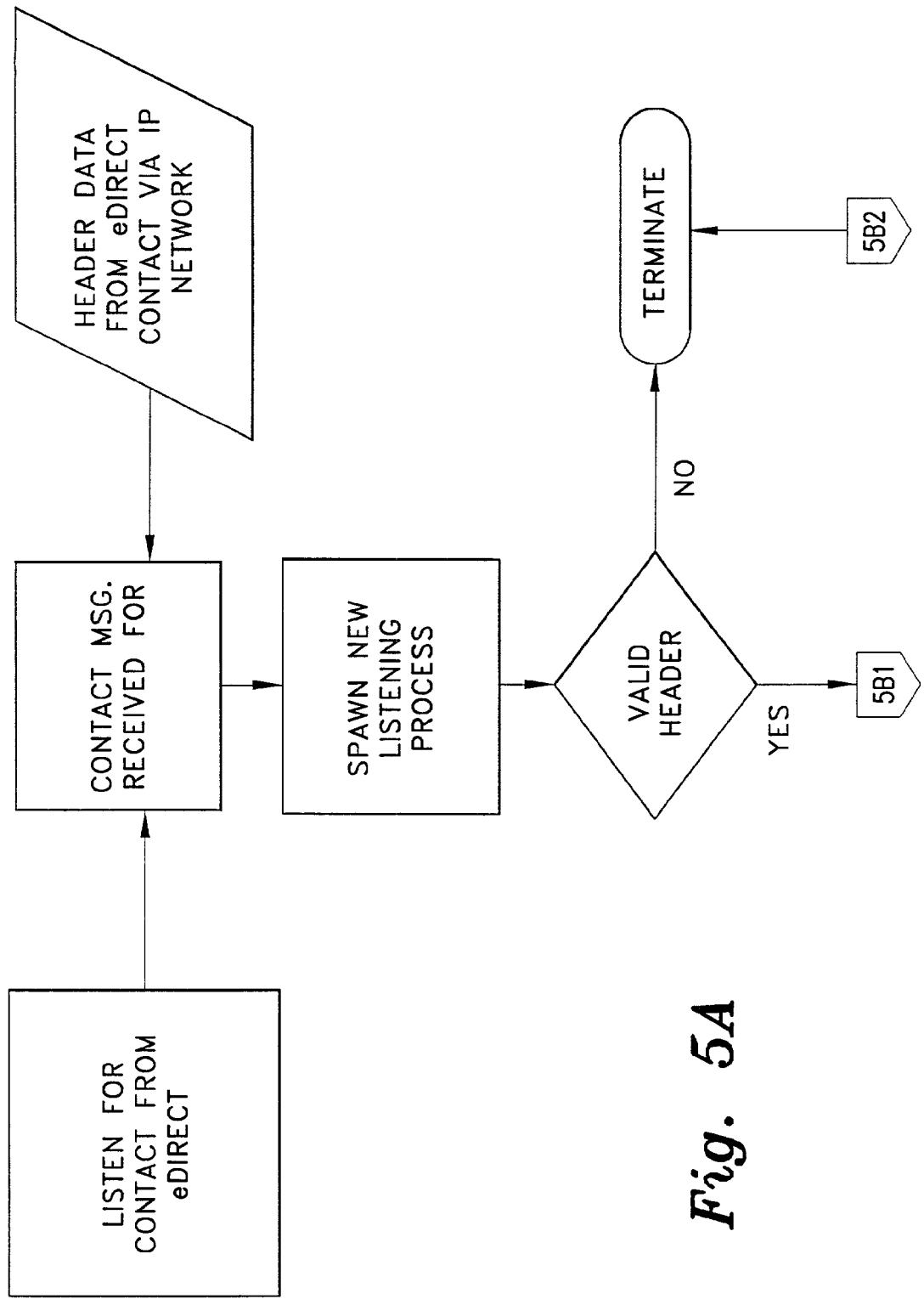
FIG. 5A is a flowchart of a first portion of a preferred process according to the present invention.
Figure 5B:
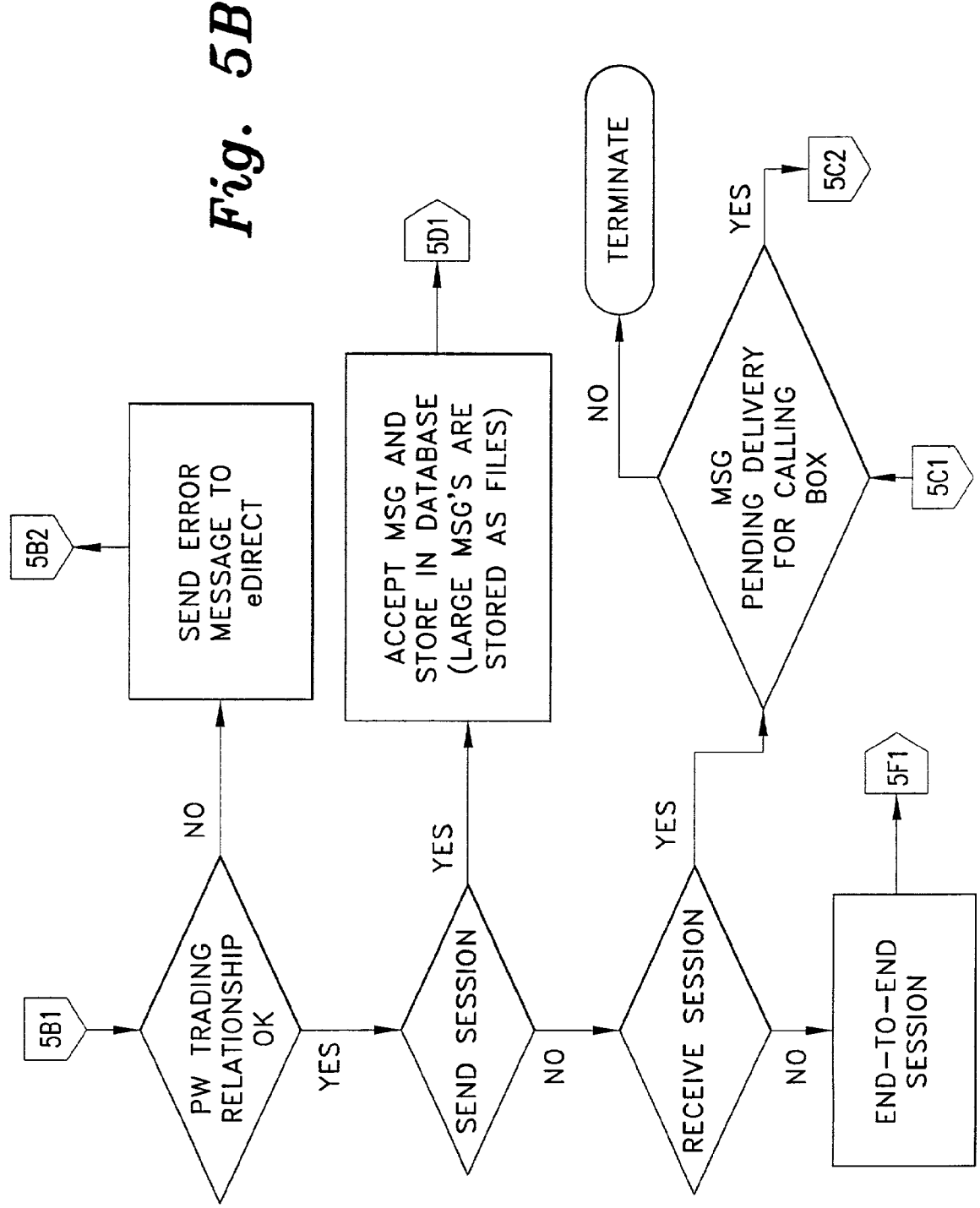
FIG. 5B is a flowchart of a second portion of a preferred process according to the present invention.
Figure 5C:
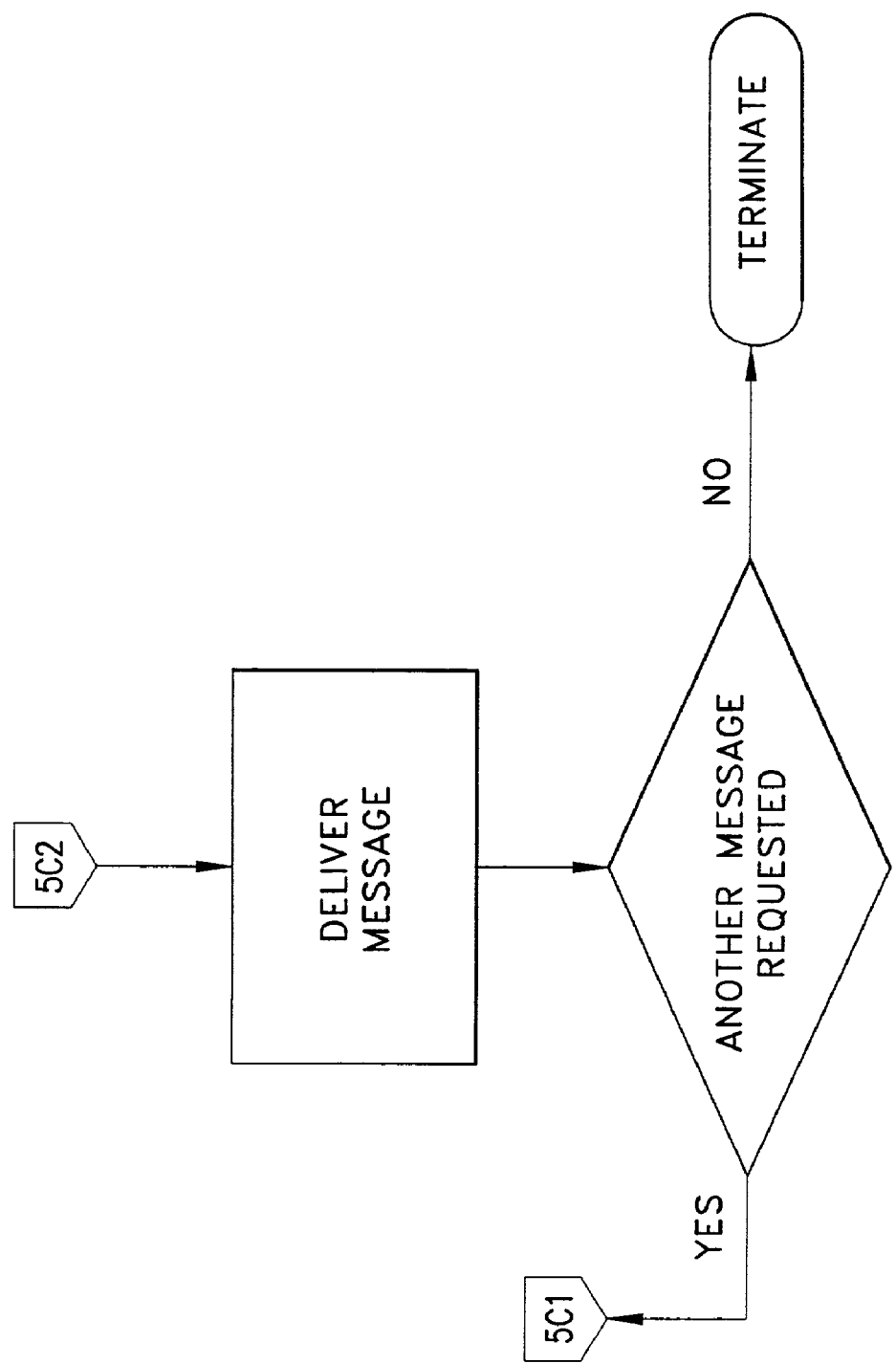
FIG. 5C is a flowchart of a third portion of a preferred process according to the present invention.
Figure 5D:
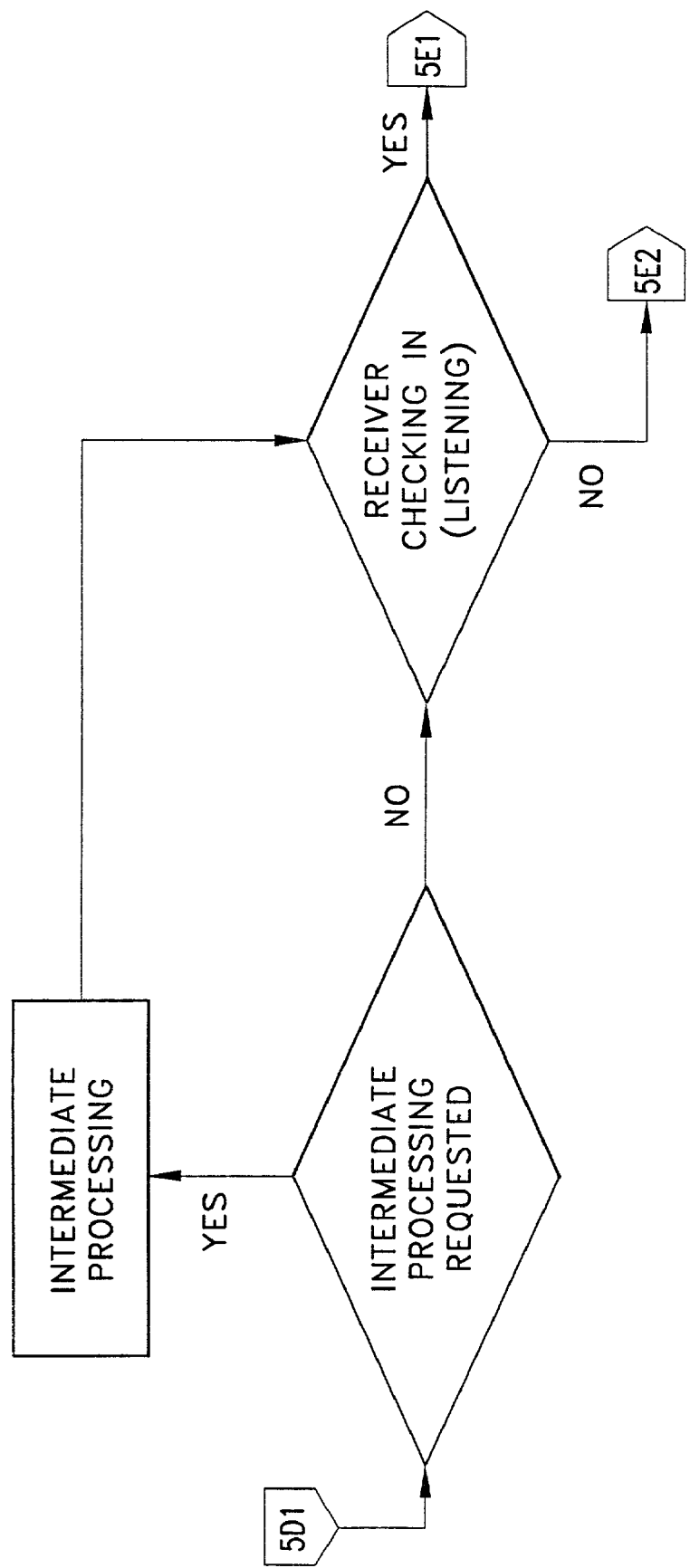
FIG. 5D is a flowchart of a fourth portion of a preferred process according to the present invention.
Figure 5E:
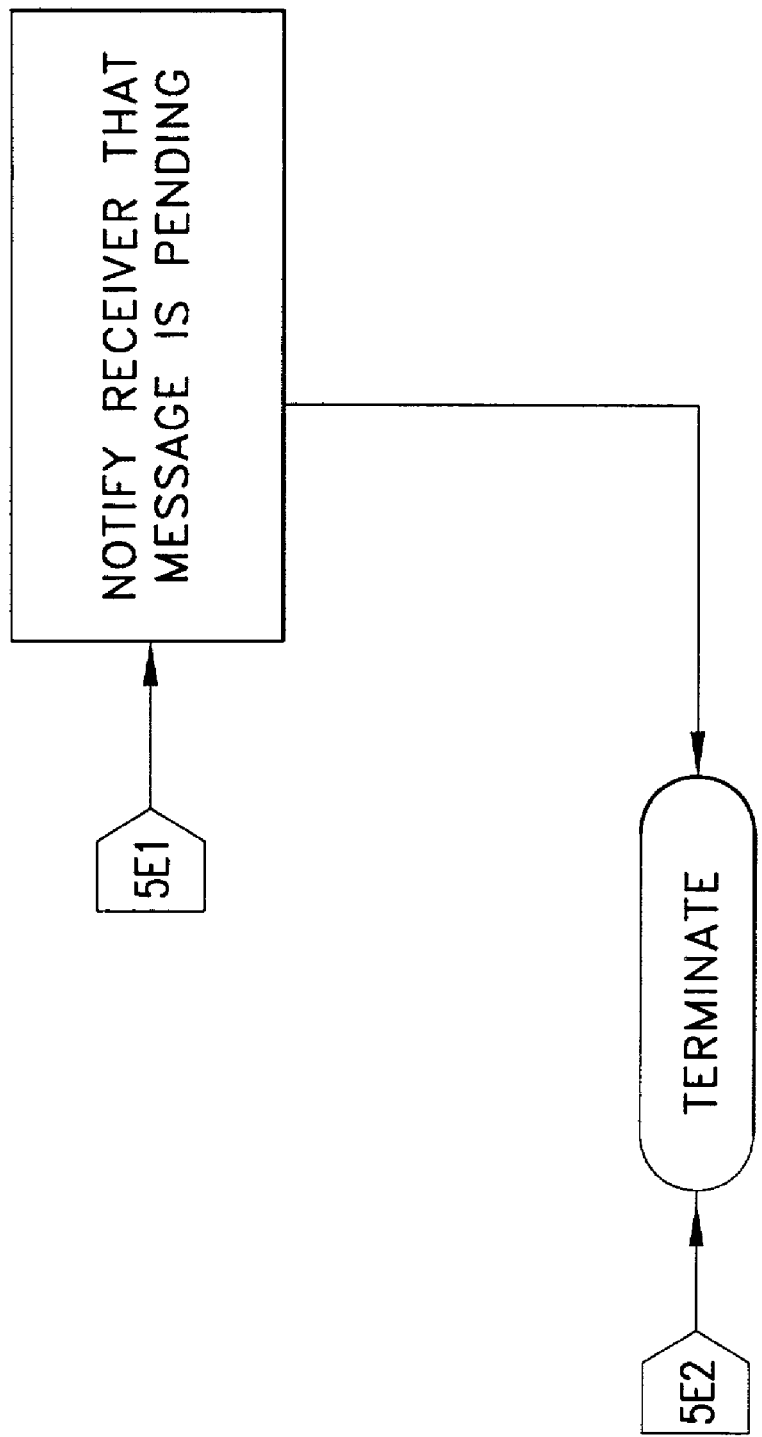
FIG. 5E is a flowchart of a fifth portion of a preferred process according to the present invention.
Figure 5F:
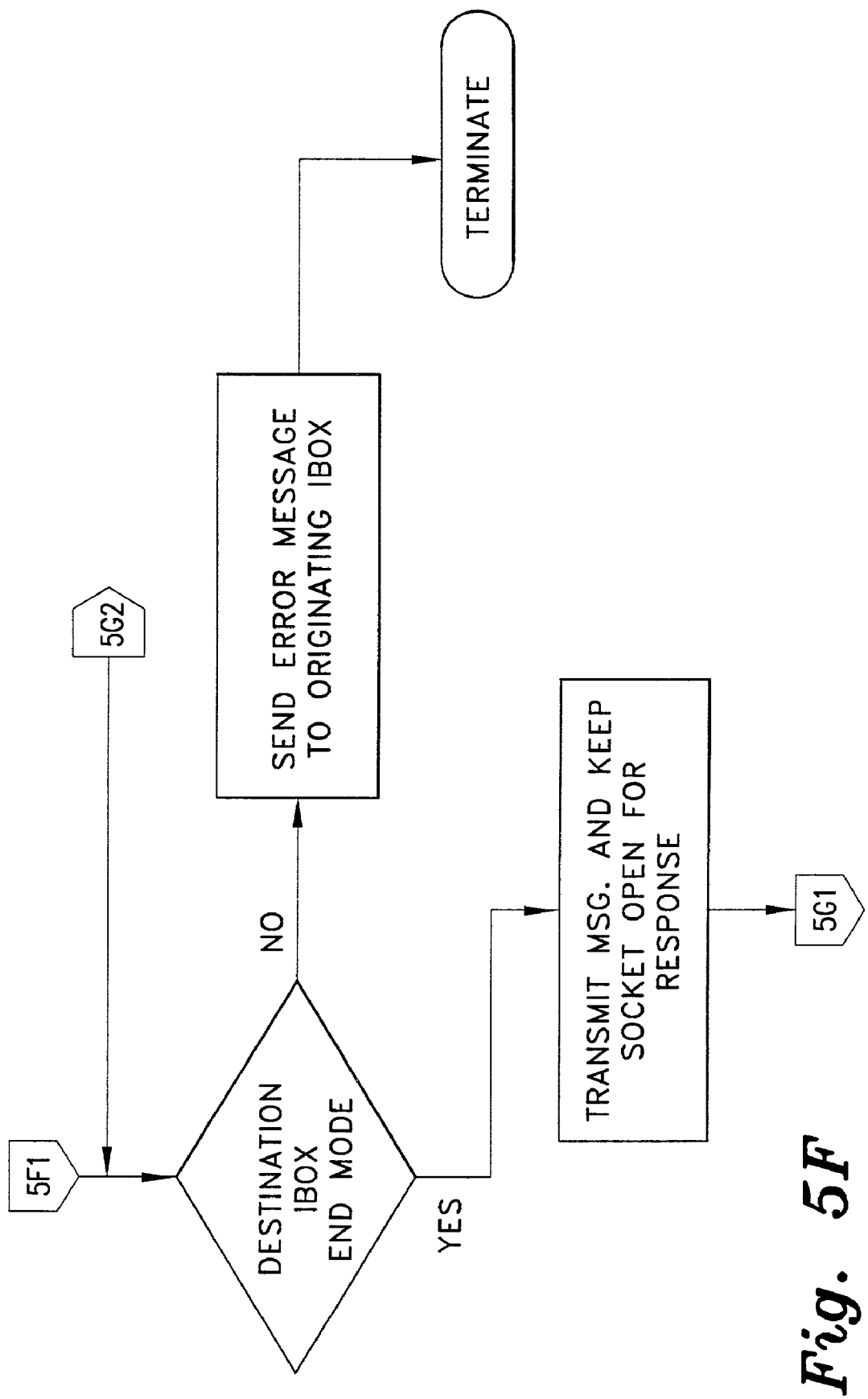
FIG. 5F is a flowchart of a sixth portion of a preferred process according to the present invention.
Figure 5G:
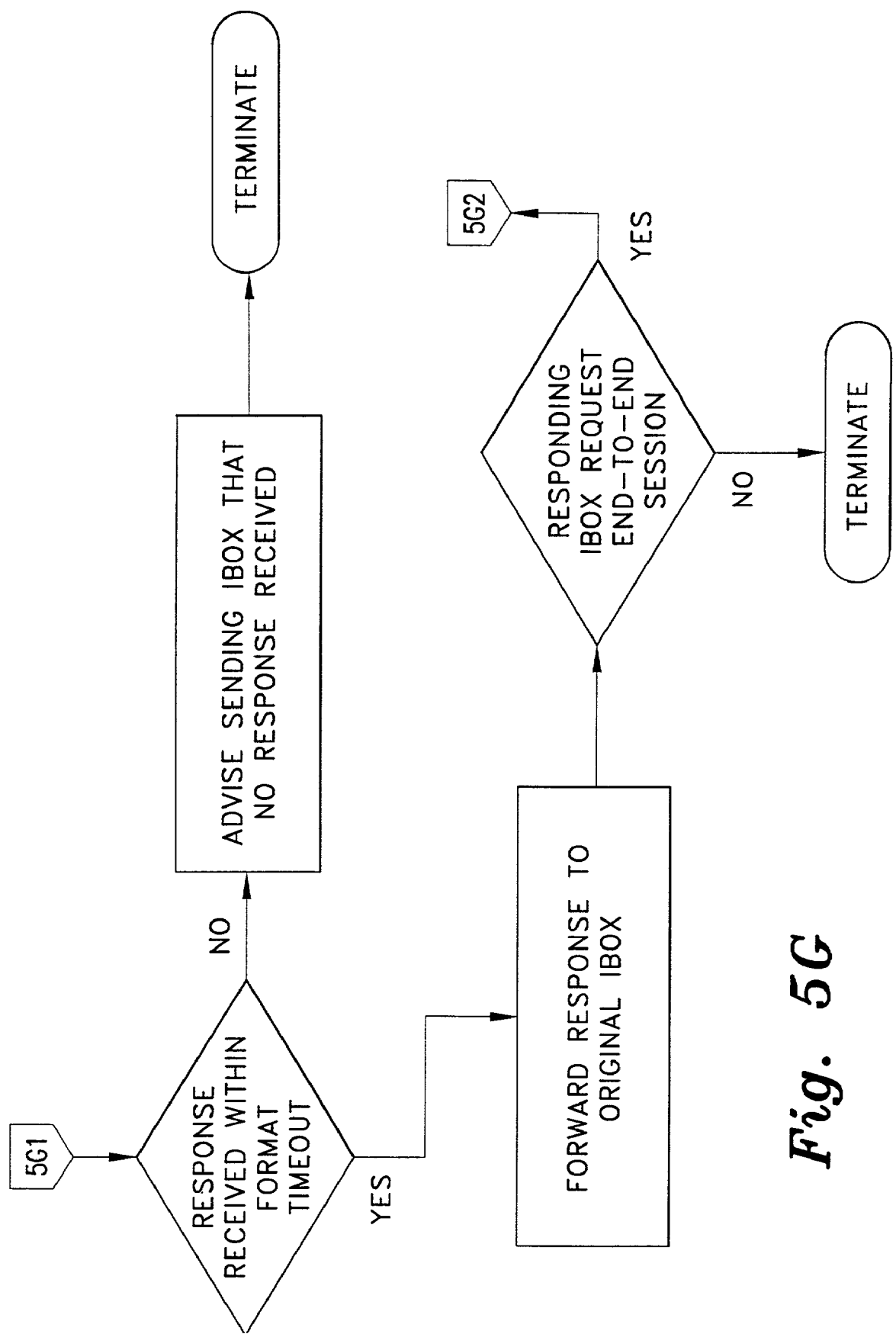
FIG. 5G is a flowchart of a seventh portion of a preferred process according to the present invention.

The present invention is an integrated on-line system for enabling dissimilar computers to exchange data and integrate applications, instantly. A generic integrated on-line system 10 according to the present invention (hereinafter referred to as the eFORWARD$^{SM}$ system) is shown in FIG. 1. The eFORWARD system$^{SM}$ 10 may be generally characterized as having a client/server architecture. The eFORWARD system$^{SM}$ 10 includes a server 12 and a plurality of clients 14, each of which are connected to a central network 18 which implements the TCP/IP protocol. FIGS. 3 and 4 show other network configurations of the eFORWARD system$^{SM}$. In FIG. 3, the eFORWARD system 10 is shown configured for providing on-line services over the Internet. In FIG. 4, the eFORWARD system$^{SM}$ is shown configured for use on an intranet or virtual private network, as the eFORWARD$^{SM}$ system may be sold as a software package to be used by a corporate entity. FIG. 4 also illustrates that the server 12 may comprise a plurality of computers linked by a local area network (LAN) or wide area network (WAN).

Figure 2:
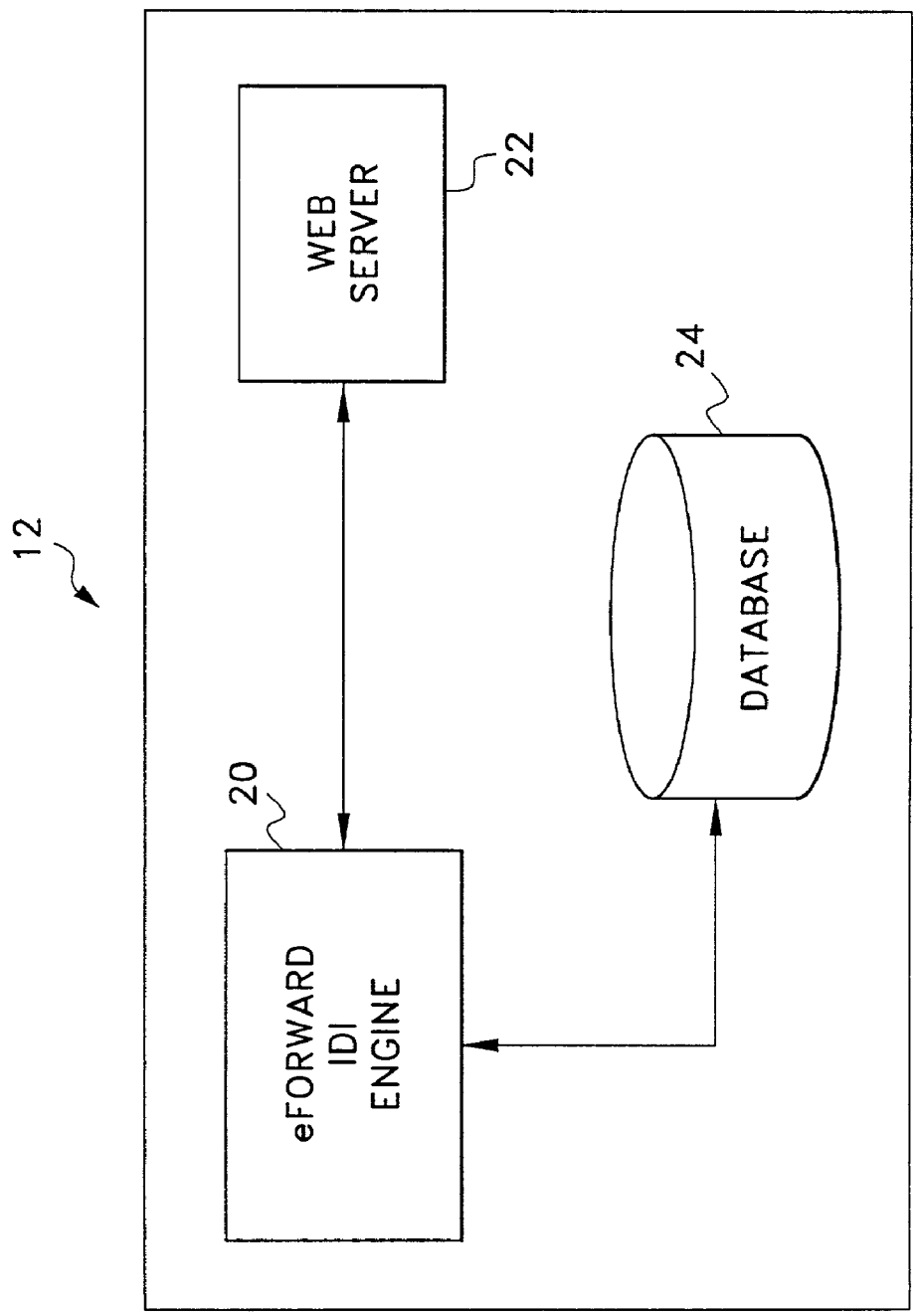
FIG. 2 is a block diagram of a preferred architecture for a server according to the present invention.

The eFORWARD server$^{SM}$. A block diagram of a preferred architecture for the server 12 (hereinafter referred to as the eFORWARD server$^{SM}$) is shown in FIG. 2. The architecture of the server 12 is defined by a purpose-built transfer protocol engine 20 (hereinafter referred to as the Instant Data Interchange™ or iDI™), a web server 22, and a database 24. The iDI™ provides a communications logic for enabling instant interchange of data between the client(s) 14 and the eFORWARD server$^{SM}$ 12. A flowchart of a preferred process implemented by the iDI™ is shown in FIGS. 5A to 5G. The iDI™ uses a flexible application program interface (a.k.a. API) for instructing the eFORWARD server 12 and/or each client 14 regarding what additional processes are to be invoked. Data may be interchanged between the clients 14 via conventional electronic mailboxes (hereinafter referred to as iBoxes$^{SM}$) residing on the eFORWARD server$^{SM}$ 12.

The eFORWARD iDI Engine. The iDI$^{SM}$ protocol 20 (a.k.a., the eFORWARD iDI Engine) serves to implement a sophisticated socket to socket data interchange protocol between each client 14 and the eFORWARD server$^{SM}$ 12. The iDI™ protocol 20 also serves to enable a eDIRECT client 14 to request a custom process other than that executed by eFORWARD$^{SM}$ service. For purposes of describing the invention, eDIRECT™ is the name given to client software residing on client computers for enabling each client 14 to communicate with the eFORWARD server 12. The custom process will be executed by the eFOR- WARD Service. In such a case, the subsequent behavior is determined by the custom process and is not documented here.

The eFORWARD Server 12 listens to each of the clients 14 to detect contact on port 2181. Port 2181 has been registered with IANA, the Internet Assigned Numbers Authority. As known to those skilled in the art, a TCP/IP socket comprises an IP address in combination with a port. The port serves as identification of the particular services offered by a server. On establishing contact with a client 14, the eFORWARD server$^{SM}$ 12 will move the connection to a new socket and will begin a new listening process on the port, and will examine a header that precedes a contact message sent by the client. If the header is unable to be processed (i.e., invalid), the session is summarily terminated.

Included in the header is all information provided to the client 14 when the client 14 was invoked. The header preferably includes a subscriber iBox$^{SM}$ id (i.e., a local iBox id) and password as well as a partner iBox$^{SM}$ id (i.e., a remote iBox$^{SM}$ id), if appropriate. The eFORWARD server$^{SM}$ will validate this data against a corresponding database. An invalid iBox$^{SM}$, password or partner iBox id will cause an error message to be generated and transmitted back to a subscriber iBox$^{SM}$. Thereafter, the session is terminated.

During a session validation, the eFORWARD server 12 will determine from the header whether the session will be a send session, a receive session, or an end-to-end session. The eFORWARD Server$^{SM}$ 12 will respond accordingly. In any case, the connection is brief and ends once the eDIRECT client$^{SM}$ 14 receives a required response, an error occurs, or a timeout occurs.

All sessions employ 'Assured Delivery'. By Assured Delivery, it is meant that successful delivery is acknowledged and recorded by the client and/or server as appropriate. Failed attempts to transmit/receive are also recorded. Additional attempts to transmit to the eFORWARD server or receive from the eFORWARD server are governed by the eDIRECT client and are determined by switch settings when invoking eDIRECT.

Send Session. eDIRECT™ may establish send sessions with the eFORWARD server 12 in one of three modes, with the optional ability to receive data as part of a Send Session:

1. a single file send mode,
2. a single batch mode then terminate, and
3. a batch mode then stay active sending files as they are deposited in a specified send directory.

In the single file mode, eDIRECT will send a single file then terminate.

In the single batch mode, eDIRECT will send all files in a specified directory which pass a specified filter and then terminate.

In the batch mode, eDIRECT will stay active after sending all files in a specified directory which pass a specified filter. Any additional files deposited in the send directory and that pass the filter will be sent.

In all modes, the sending eDIRECT™ will specify a partner iBox$^{SM}$ to receive a message) and, optionally, a process that is requested to be executed by the receiving partner's host on receipt of a message. However, a receiving partner may override a request to execute a given process upon receipt of the message. Any requested process must be a Java class process in the receiver's Edbins package. An incoming message is preferably accepted and stored in the database 24 for forwarding onto the partner and/or intermediate host processing as required.

The eFORWARD Server$^{SM}$ 12 also records the number of characters in the message for auditing and billing purposes. Confirmation of the successful receipt of the message by the eFORWARD Server$^{SM}$ 12 is immediately sent to a sending client 14.

If intermediate processing has been requested by a sending client 14, the eFORWARD Server$^{SM}$ 12 will invoke an intermediate process specified below. Immediately upon receipt of the message by the eFORWARD server$^{SM}$ 12, the eFORWARD server$^{SM}$ 12 determines whether the partner eDIRECT™ is 'checked in' (i.e. listening). If so, contact with a listening eDIRECT client$^{SM}$ is attempted by sending a short message to the specified IP address and listening port. If a destination eDIRECT$^{SM}$ client responds, then the message is immediately delivered and so marked in the eFORWARD Server database 24. If the partner iBox$^{SM}$ eDIRECT client does not respond, then the message is retained in the eFORWARD database 24 until the partner iBox$^{SM}$ eDIRECT client contacts the eFORWARD Server 12 and requests delivery. An iBox eDIRECT Client is considered to be listening if it has sent the eFORWARD Server a message within the previous 'n' minutes advising it of the IP address and port number on which it is listening. The number of minutes, 'n', is an installation parameter.

Once a message is delivered, its audit trail in the eFORWARD database 24 is marked. The message will be retained in the database 24 for a pre-determined number of days (retain period) against the possibility that a re-transmission will be requested. The message will be deleted once the retain period is over.

If message delivery is not requested within the retain period, then the message is deleted from the database and so noted in its audit trail.

Receive Session. While establishing a valid session with the eFORWARD Server$^{SM}$ 12, eDIRECT™ may request a receive session in one of three modes: 1) Receive a single message, 2) Receive in Single Batch mode and discontinue the session, and 3) Receive in Batch mode and request server call back (eDIRECT stays in listening mode). In each case, eDIRECT™ may request that messages from all transmitting iBoxes$^{SM}$ (a.k.a., trading partners) addressed to a specific iBox$^{SM}$ be delivered or that messages only from a single specified trading partner be delivered.

If eDIRECT™ requests a single message, then the oldest undelivered message will be transmitted to eDIRECT and the session terminated.

If eDIRECT™ requests a Single Batch receive then all waiting messages will be transmitted by the eFORWARD Server in order of their receipt and the session terminated.

If a batch receive with server call back is requested then all waiting messages will be transmitted by the Server in order of their receipt and the eDIRECT IP address and call back port is recorded for instant delivery when/if subsequent message arrive for the specified iBox. The call back request must be refreshed every 'n' minutes or the server will discontinue honoring the call back request.

End-to-End Session. When eDIRECT™ requests an end-to-end session as an option to a send session, eFORWARD™ will keep the send session open requesting a response from a receiving iBox$^{SM}$. The response when received by the eFORWARD server$^{SM}$ 12 will be immediately relayed back to the original transmitting iBox$^{SM}$. Thereafter, the eFORWARD$^{SM}$ server$^{SM}$ 12 uses the call back feature to notify eDIRECT™ that a message is pending delivery from eFORWARD$^{SM}$. If the partner iBox (eDIRECT) is in Instant Receive (callback) mode it will instantly retrieve the message and respond accordingly to the solicitation for a response. If no response is forthcoming, e.g. if eDIRECT is not in Instant Receive mode, then a failure condition is generated and returned to the original transmitting iBox$^{SM}$. optionally, the subscribing iBox can specify that in the event of a failure to get a response while on-line that a delayed response may be delivered later during normal usage.

The Web server. The web server 22 is a conventional web server that supports a conventional web browser interface, such as Netscape Navigator® and Microsoft Explorer®, for enabling users to administer and report on eFORWARD$^{SM}$ activities. For example, the web server 22 may be used for enabling a user to create iBoxes$^{SM}$ and to define corresponding trading relationships. Administrative data pertaining to the iBoxes$^{SM}$ are kept in the database 24 described hereinafter in this application. The web server 22 will typically listen for clients on the well known port 80.

Users of the eFORWARD system$^{SM}$ 10 may use the web server 22 for requesting that specific messages be re-queued for sending. Messages are retained in the database 24 for a specific number of days before being deleted. Each messages is flagged as having been delivered once the message has been transmitted to a receiving iBox$^{SM}$. Thereafter, each message remains eligible for re-sending until it has been deleted from the database 24.

Java Servelets may also be used for enabling the web server 22 to interact with the database 24.

The web server 22 may also be used for enabling a user to make inquires regarding the status of specific interchanges. A user can also request reports detailing interchanges between iBoxes$^{SM}$ subject to control by an administrator.

The database. The database 24 is a conventional relational database (a.k.a., the eFORWARD database$^{SM}$) for recording administrative and operational data. Preferably, the administrative data includes: subscriber ID's, iBox$^{SM}$ ID's, passwords, and trading relationships, all of which are used to validate sending and receiving requests. Whereas, the operational data preferably includes: actual data messages and their associated audit trails, traffic statistics (i.e., number of sessions and character counts), and call back information (e.g., IP addresses and listening ports).

The eDIRECT Client$^{SM}$. Client software (hereinafter referred to as the eDIRECT Client™) is a Java program that resides on a host machine. Pure JAVA language is used for the eDIRECT Client$^{SM}$ for ensuring cross platform compatibility. Accordingly, the eDIRECT Client$^{SM}$ serves to send and receive messages via the eFORWARD Server$^{SM}$ 12. The eDIRECT Client$^{SM}$ is available in both Command Line and Windowed versions and is accessible through a JAVA API. The Command Line version may run from an OS command prompt, a calling program, a DOS batch file or a Unix shell script.

The eDIRECT Client$^{SM}$ contains an open class interface, capable of being embedded in other applications. This configuration creates a powerful tool for integration with remote applications. The Windowed versions utilizes a GUI interface whereby a user may select or input the value of switches to control eDIRECT functions. A description of representative eDIRECT switches, according to the present invention, and corresponding functions associated therewith is provided in Appendix A. Contained in Appendix B are specific examples illustrating usage of the eFORWARD server$^{SM}$.

Description of eDIRECT switches. The following is a description of various switches which may be used when invoking eDIRECT. The switches are presented in command line format. It will be understood that in a GUI environment the switches will either be added automatically when certain menu options are selected by the user, or they may be selected manually through dialog boxes presented to the user when the menu options are selected.

eDIRECT Command Line Version usage:
java Edirect.EdiSend
-h{host}
-p[process] [,destination process]
[-f{file}]
[-r(receive mode) [[j,]process (FILE)]]
[-v]
[-s{subscriber}]
[-w{password}]
[-i{process parameters}]
[-a(single batch mode) [retries]]
[-l{logfile}] [-e(ebcdic){srb}]
[-o{local mailbox}] [-d{remote mailbox}]
[-j{batch send path}] [-k{batch archive/receive path}]
[-t{[eForward port] [,local port] [,local IP address]}]
where:
-h{host}
'host' is the domain name or IP address of the host (eFORWARD Server) where process specified in the -p switch resides. The default process is 'eforward'.
-p{process}} [,destination process]
'process' is the name of the process to be executed by the host when contact is made. 'destination process' is the name of the process to executed by the receiving iBox client. The destination process must be in the destination machine's java package 'Edbins', e.g. -p ",edit" ->Edbins.Edit(String [ ] st) where st[0]=sent_file_name.
[-i{process parameters}]
The 'process parameters' entered after the -i switch will be passed to the 'destination process' identified in the -p switch
[-f{file}]
When batch sending the -f parameter is used for a filename string match. The match is exact including 'periods', e.g. -f. matches 'test.txt' on the extension separator character (all files with extensions will match). If more than one matching string is desired, then use a comma to separate them, e.g. -f.txt,doc will match any filename with 'txt' or 'doc' in them. This includes the separator.
[-r(receive mode) [[j,] process (FILE)]]
The default mode for eDIRECT is "send". Inclusion of the -r switch puts eDIRECT into the receive mode.
When receiving, the received file can optionally be processed using the program name following the -r switch. The file name will be the first parameter to the program unless the word FILE appears in upper case within the process command line. If "j," proceeds the process then a java class in the package 'Edbinr' will be called, e.g. -r "runme.exe firstparm secondparm FILE thirdparm", e.g. -r "j,edit" ->Edbinr-Edit(String [ ] st) where st [0]=received_file_name.
[-v]
Inclusion of the -v switch puts eDIRECT into the verbose mode where buy operational messages will be printed to the console.
[-c]
Use the -c switch to indicate an end-to-end session
[-w{password}]

Password assigned to the subscriber iBox name identified in the -o switch.

[-a (single batch mode) [retries]]

Inclusion of the -a switch will put eDIRECT into the single batch mode where 'retries' is the number of attempts to send or receive the batch.

[-l{logfile}] [-e(ebcdic){srb}]

'logfile' is the name (including path) of the file to which logging messages are to be written.

Inclusion of the -e switch will cause eDIRECT to convert between ascii and ebcdic. The parameter immediately following the -e switch indicates when the translation takes place as follows:

s Use 's' to indicate that outbound (sent) messages are to be translated to ascii. Inbound messages are not translated.

r Use 'r' to indicate that inbound (received) messages are to be translated from ascii to ebcdic. Outbound messages are not translated.

b This is the default and indicates that all outbound messages are to be translated from ebcdic to ascii and all inbound messages are to be translated from ascii to ebcdic.

[-o{subscriber iBox}] [-d{partner iBox}]

'subscriber iBox' is the id of the subscriber iBox.

'partner iBox' is the id of the partner iBox.

If the -d switch is omitted, then the eDIRECT client will look for a Standard message envelope in the file(s) to be sent from which it can obtain the receiver's iBox address. Standard Envelopes currently supported are: TDCC, ISA & EDIFACT.

[-j{batch send path}] [-k{batch archive/receive path}]

The 'batch send path' is the path on the local machine from which files will be sent. 'batch archive/receive path' is the archive path when eDIRECT is in send mode. 'receive path' identifies the directory into which received files are put when in receive mode.

[-t{[eFORWARD port] [,local port] [,local IP address]}]

'eFORWARD port' is the port number on which the eFORWARD Server will be listening for contact by the eDIRECT client. It should be left blank so that the default port number will be used. 'local port' enables eDirect to specify a specific port number on which it will listen for eFORWARD Server callback indicating to eDIRECT that a message is pending delivery by the eFORWARD Server. This is useful for bypassing the receiver's firewall. If call back is not desired, e.g. because of firewall considerations, set the local port number to '0'. 'local IP address' is an IP address that the eFORWARD server should use for callback. The default value is the current IP address.

[-s[n]]

'n' is the Data Key size in bits. The -s switch is used to indicate this is a secure session.

Examples Showing Usage of eDIRECT Switches.

The following examples illustrate sample eDIRECT command lines using a server testing process called "hello" instead of "eFORWARD" for sending and receiving messages to eDIRECT clients. The parameters used hereinbelow are common to both processes (i.e., "hello" and "eFORWARD").

EXAMPLE 1

Send one file to partner(box2) and return to calling program.

java Edirect.EdiSend -v -h127.0.0.1 -ftestfile.txt -phello -sjohn -wpass -obox1 -dbox2

EXAMPLE 2

Send one file to partner(box2) retrying 5 times(if needed) and return to calling program.

java Edirect.EdiSend -v -h127.0.0.1 -ftestfile.txt -phello -sjohn -wpass -obox1-dbox2 -a5

EXAMPLE 3

Send in batch mode to partner(box2) and run continuously (polling mode). This will send all files with extensions or a period in the name.

java Edirect.EdiSend -v -h127.0.0.1 -f. -j\java\senddir -k\java\arcdir -phello -sjohn -wpass -obox1 -dbox2

EXAMPLE 4

Send one batch to partner(box2) and return to calling program. This will send all files with extensions or a period in the name.

java Edirect.EdiSend -v -h127.0.0.1 -f. -j\java\senddir -k\java\arcdir -phello -sjohn -wpass -obox1 -dbox2 -a

EXAMPLE 5

Receive one file from partner(box1) and return to calling program.

java Edirect.EdiSend -v -h127.0.0.1 -r -phello -sbill -wpass -obox2 -dbox1

EXAMPLE 6

Receive one file from partner(box1) renaming file try.txt and return to calling program.

java Edirect.EdiSend -v -h127.0.0.1 -r -phello -sbill -wpass -obox2 -dbox1 -ftry.txt

EXAMPLE 7

Receive one file from partner(box1) and run process edit.exe and return to calling program.

java Edirect.EdiSend -v -h127.0.0.1 -redit.exe -phello -sbill -wpass -obox2 -dbox1

EXAMPLE 8

Receive one file from partner(box1) retrying 5 times(if needed) and return to calling program.

java Edirect.EdiSend -v -h127.0.0.1 -r -phello -sbill -wpass -obox2 -dbox1 -a5

EXAMPLE 9

Receive in batch mode from partner(box1) and run continuously with server callback.

java Edirect.EdiSend -v -h127.0.0.1 -r -k\java\recdir -phello -sbill -wpass -obox2 -dbox1

EXAMPLE 10

Receive in batch mode from partner(box1) and run process edit.exe and run continuously with server callback.
    java Edirect.EdiSend -v -h127.0.0.1 -redit.exe -k\java\recdir -phello -sbill -wpass -obox2 -dbox1

EXAMPLE 11

Receive one batch from partner(box1) and return to calling program.
    java Edirect.EdiSend -v -h127.0.0.1 -r -k\java\recdir -phello -sbill -wpass -obox2 -dbox1 -a

EXAMPLE 12

Receive in batch mode from ALL partners and run continuously with server callback.
    java Edirect.EdiSend -v -h127.0.0.1 -r -k\java\recdir -phello -sbill -wpass -obox2

Dual key encryption method. An encryption methodology is available in the system as an optional feature which, when combined with the standard features of the enhanced data transfer protocol, gives the system the following advantages: capability for instant message delivery; message delivery verification; data integrity; an exceptionally high level of security for sensitive data transmissions over the Internet; sender authentication; and non-repudiation.

Data is moved from Client to Client (Trade Partner to Trade Partner) via the server 12. The server 12 acts as a trusted third party and utilizes a unique dual key implementation based on standard key exchange and data encryption algorithms. All communications are between the client and the server, never directly between client and client. Data encrypted by a Sending Client (Trade Partner) 14 is forwarded in its encrypted form by the server 12 to a Receiving Client (Trade Partner) 14. In addition to the data forwarding function, the server 12 acts as a secure channel passing the data encryption keys from the Sending Client 14 to the Receiving Client.

An example of how dual key data encryption can be used with the system 10 of the present invention will now be illustrated by an implementation which utilizes the Diffie-Hellman key exchange methodology and the Rijndael block cipher algorithm. However, it will be understood by those skilled in the art that the system architecture is not limited to the particular encryption methodologies shown in the example, but may be used to implement a dual key encryption method based on any desired key exchange algorithm and any desired block transfer encryption algorithm.

The dual key encryption method requires two fundamental types of session modes between Client and Server, viz., a header key initialization session mode; and a data exchange (send/receive) session mode. Both types of sessions are initiated by the Client.

The Header acts as a secure channel by which control data and Data Encryption keys are passed between Client and Server. Header keys are used to encrypt the Header data. The header key initialization session mode provides a highly secure mechanism for re-initializing Header keys. Between re-initializations, Header keys are changed for every data exchange session mode through a key rotation system.

The data exchange session mode is used to actually move the encrypted data from Client to Server and from Server to Client. The data is encrypted by an algorithm which uses a Data key which is passed from the Sending Client via the Server to the Receiving Client utilizing the Headers.

The header key initialization session mode will now be explained with reference to FIG. 6. As noted above, the header key initialization process will utilize the Diffie-Hellman key exchange method for purposes of illustrating initialization (or re-initialization) of the Header key.

The discussion which follows is based on the following definitions.

p denotes a large prime number.

$Z_p$ denotes a multiplicative group of integers $\{a|0<a<p\}$ where p is a prime number.

$\alpha$ denotes a generator for $Z_p$.

x denotes a secret integer, $0<x<p-1$, known only to the Client.

y denotes a secret integer, $0<y<p-1$, known only to the Server.

r denotes a random number used as an Initialization vector for hashing and encryption.

Further, let:

$M_C = \alpha^x \mod p$ be passed in a public message generated by Client and sent to Server.

$M_S = \alpha^y \mod p$ be passed in a public message generated by Server and sent to Client.

$K_S = (M_C)^y \mod p$ be an encryption key computed by the Server.

$K_C = (M_S)^x \mod p$ be an encryption key computed by the Client.

$K_S = K_C$.

Figure 6:
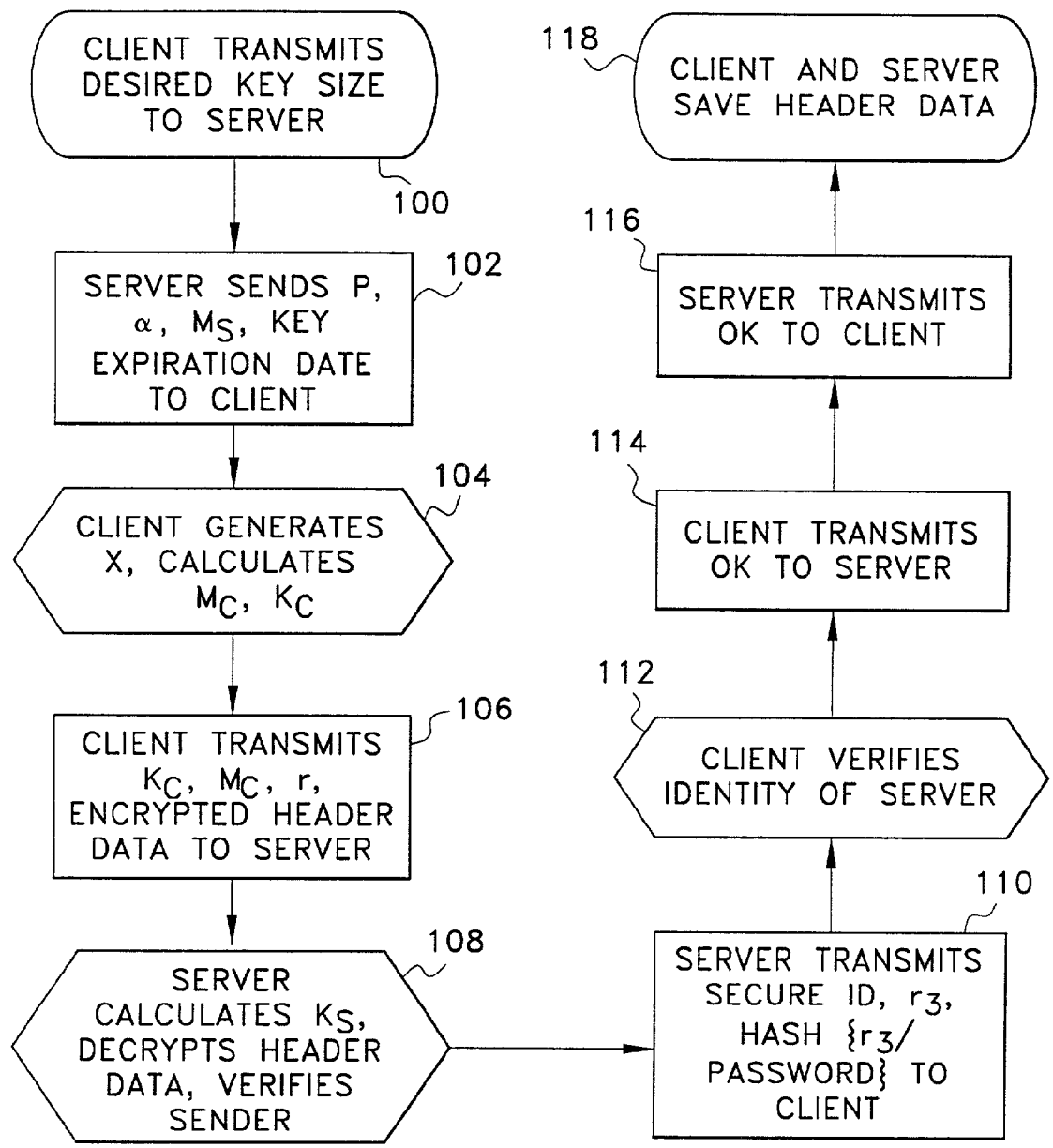
FIG. 6 is a flowchart showing a header key initialization session for setting an encryption key used to encrypt header data.

Referring to FIG. 6, a Client 14 initiates the header key initialization session mode by transmitting to the Server 12 a desired key size, as shown at 100. The Server responds at step 102 by returning p, $\alpha$, and $M_C$, as well as the interval for key re-initialization. The Client generates its secret integer $\{x|0<x<p-1\}$ and uses it to compute $M_C$ and $K_C$ at 104. The Client then transmits $K_C$, $M_C$, and a random number r to be used as an initialization vector when encrypting. Both $M_C$ and r are transmitted to the Server in the clear. In this transmission 106, the Client also sends encrypted Header data, including a Sender/Receiver pair, a code indicating whether this Header key is associated with a Send or Receive session mode, a random number r used as an initialization vector for hashing the old password (from the previous header key initialization session mode), and a new password to be used in the next header key initialization session mode. The encryption uses $K_C$ that the Client calculates based on its x and the p, $\alpha$ and $M_S$ just received from the Server. $K_C$ is the Initial Header Key. The first time a header key initialization session mode is conducted the old password is obtained through a separate communications channel.

The Server can now calculate $K_S$, which will be in agreement with $K_C$, and uses it to decrypt the Header Data just received. The hashed old password in the Header serves to establish the identity of the Sender 108. The encryption/decryption is done using the Rijndael block cipher algorithm and the Initial Header Key ($K_C = K_S$). The Server verifies the identity of the Client by comparing a hash of the password it has for the Client given the initialization vector, r, it just received from the Client.

The Server establishes its identity to the Client by selecting a new initiation vector, $r_3$, and using it to hash the password. The new initialization vector and the hash are sent to the Client 110. The Server also returns to the Client a Secure ID that the Client will use to initiate its next data exchange session mode with the Server.

The Client conducts its own hash of the old password with the initialization vector ($r_3$) just received from the Server. If this hash is in agreement with the hash sent by the Server, then the Client has verified the identity of the Server at step 112. The Client signals OK to the Server to signify that the Server's identity is verified 114, and the Server responds OK to the Client to signify that the Header key has been initialized successfully 116. The Client and Server have now verified the identity of each and can now each record the exchanged Header Data 118 (including the Initial Header Key [$K_C$]) for use in the next data exchange session mode.

Subsequent Header keys are generated by the Client and sent to the Server via the encrypted Header which is used in the data exchange session mode.

A new header key initialization session mode is triggered by the Client whenever the Client attempts to use the Header key after it has expired or if the Client attempts to use the key after failure of a data exchange session mode.

From a security standpoint, it is desirable to change keys for every transmission. This can impose a heavy computational load on the Client if the Diffie-Hellman algorithm must be computed for each transmission. In order to reduce this load while still maintaining a higher security level, the Client will chain keys from data exchange session to data exchange session. by passing to the Server a new Header key in the Header of the data exchange session mode, key encrypted using the Header key specified in the previous session mode. When the key re-initialization interval has passed, a full Diffie-Hellman key exchange (header key initialization mode) will be performed to reduce the possibility of the discovery of a current key and to limit its usefulness to an intruder should it be discovered.

Figure 7A:
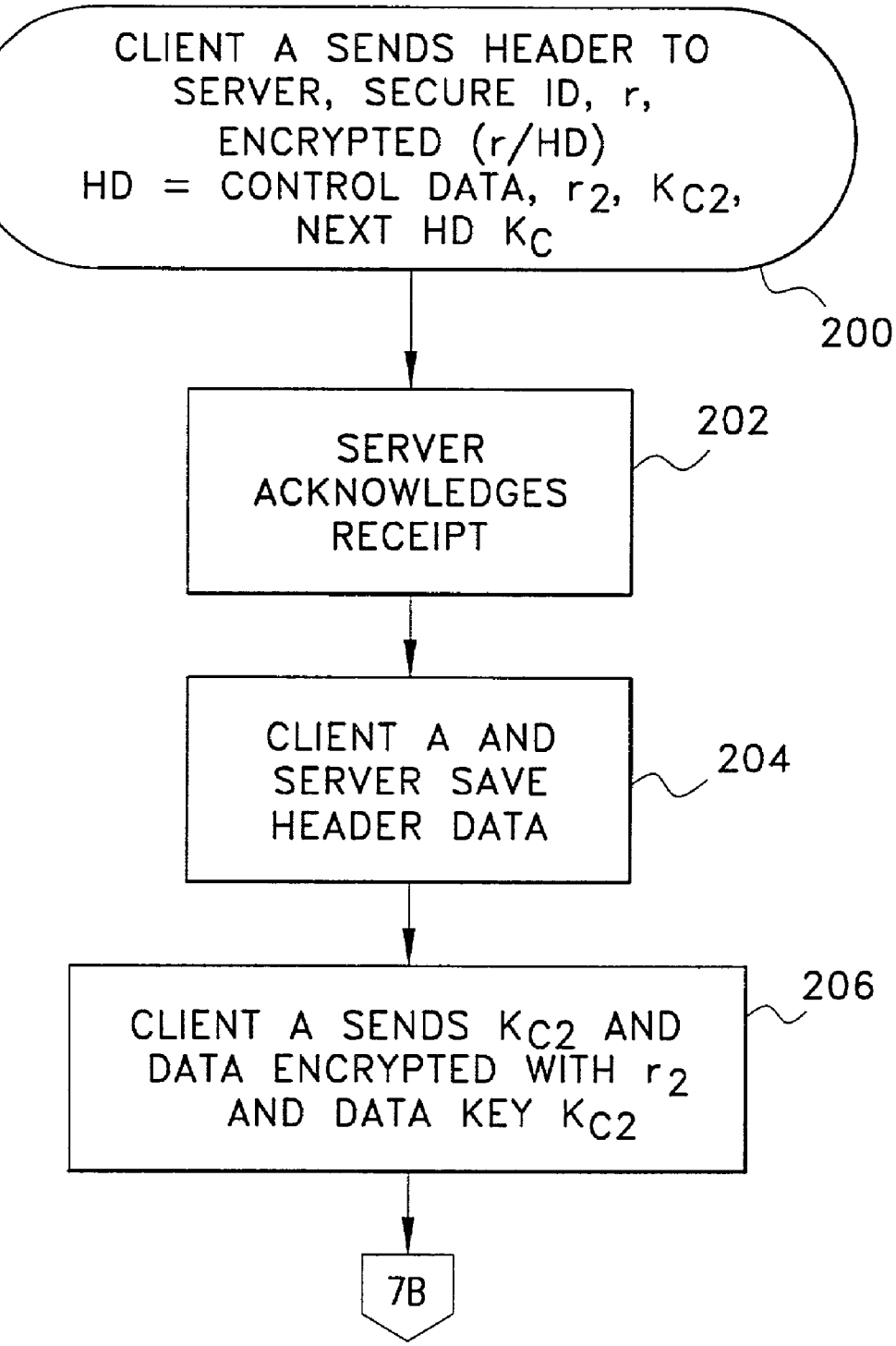
FIGS. 7A and 7B present a flowchart showing a data exchange session using a header key and a data key for the transfer of an encrypted message.
Figure 7B:
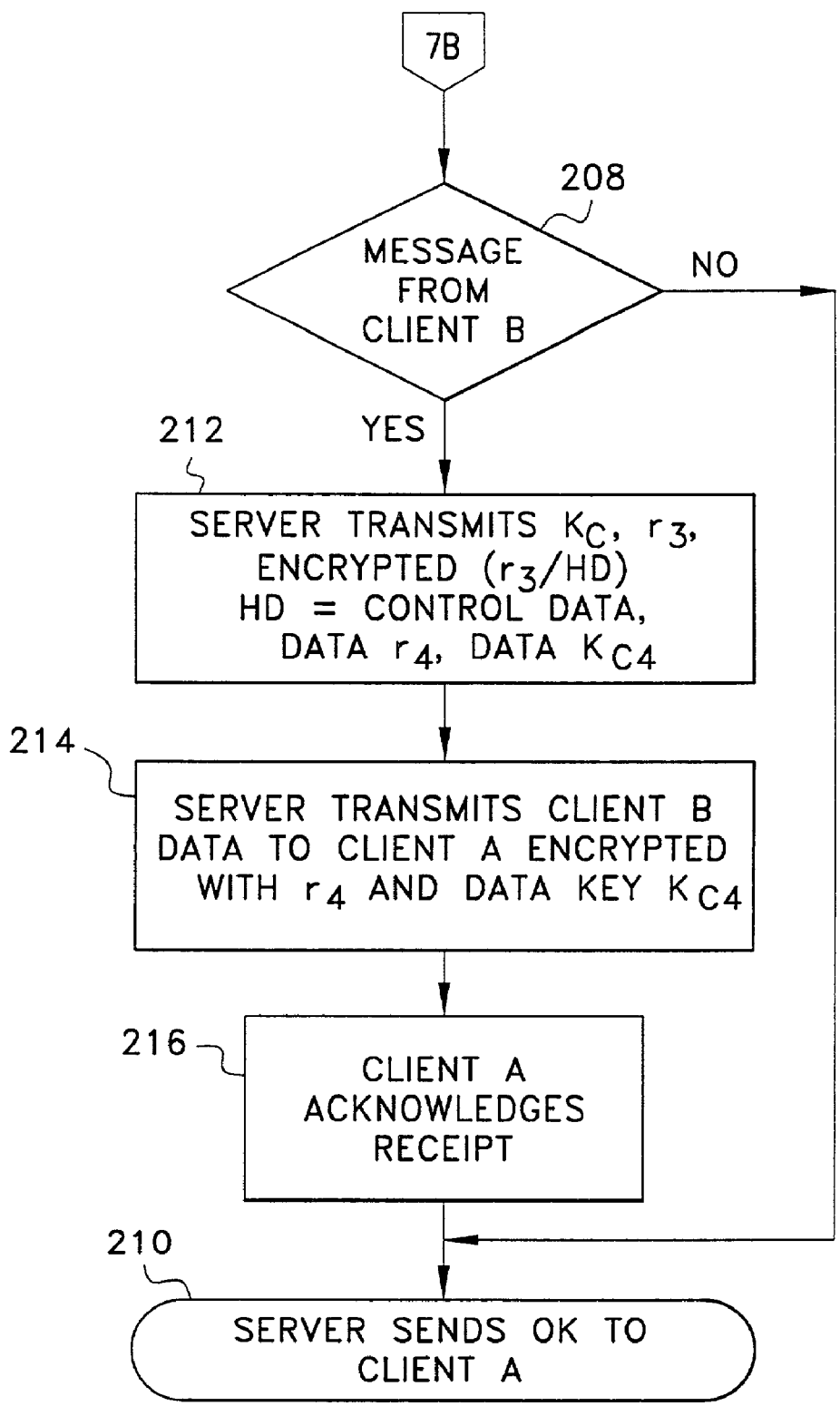

The implementation of encryption in a data exchange session mode is illustrated in FIGS. 7A and 7B. There are two kinds of data exchange session modes: a send and receive session mode; and a receive only session mode. In all cases the data exchange session mode is initiated as shown at 200 by Client A sending to the Server, in the clear, the Secure ID and a random number r, followed by an encrypted Header that includes the new Header key ($K_C$) for use in the next data exchange session mode; Header Data providing Sender/Receiver ID's, as well as various control data; and the random number $r_2$ used as the initialization vector for Data encryption, and the Data key ($K_{C2}$) to be used in this session. The initialization vector $r_2$ and Data key $K_{C2}$ will be passed on to the Receiver Client for use in decrypting the data. The Server will acknowledge receipt of the Header transmission 202, at which point the Client A and Server save the Header Data 204. Client A will use the data encryption initialization vector $r_2$ and the Data key $K_{C2}$ to encrypt any data being sent to the Server, and sends the encrypted data to the Server at 206. If there is no data to be sent to the Server, i.e., if this is a Receive Only session, the sent Data will be null.

The Server then checks Client A's electronic mailbox to see if there is a message or data file transfer from Client B which has not yet been delivered to Client A at step 208. If there are no messages or other data waiting for transfer to Client A, the Server sends OK 210 to the Client and the session is terminated. If there is a message or a data file waiting for delivery to Client A from Client B, then at 212 the Server transmits the Header key $K_C$ for identification, a new initialization vector $r_3$, and an encrypted header (encrypted using $r_3$ and $K_C$) which contains control data, an initialization vector $r_4$ provided by the sender (Client B), and a Data key ($K_{C4}$) also provided by Client B. The Server then transmits Client B's data to Client A at step 214, Client B's data being encrypted using $r_4$ and $K_{C4}$. After the data has been transferred to Client A, Client A acknowledges receipt 216 of the data and Server terminates the data exchange session mode by sending OK to Client A 210.

It is to be understood that the present invention is not limited to the sole embodiments described above, but encompasses any and all embodiments within the scope of the following claims.

We claim:

1. An integrated on-line system with an enhanced data transfer protocol for transferring data on a TCP/IP network, comprising at least one computer configured as a data transfer server connected to the network, the data transfer server having:
    (a) a web server means for providing a plurality of clients with a browser-based interface with said data transfer server;
    (b) a relational database, said web server communicating with the database for retrieving and recording information, said database having means for establishing and maintaining an electronic mailbox for a plurality of clients; and
    (c) a data transfer protocol means for providing a socket to socket connection with a client for the transfer of data according to an enhanced data transfer protocol, said protocol means having:
        (i) means for receiving data from a first client and a request to forward the data to a second client;
        (ii) means for immediately transferring the data to the second client when the second client is connected to said data transfer server by a socket when the data is received by said data transfer server;
        (iii) means for storing the data in an electronic mailbox when the second client is not connected to said data transfer server when the data is received by said data transfer server; and
        (iv) means for recording the receipt and transfer of data in said relational database.

2. The integrated on-line system according to claim 1, further comprising means for registering a plurality of trading partners as clients permitted to use the system for transferring data.

3. The integrated on-line system according to claim 1, wherein said data transfer protocol means further comprises means for notifying the first client when the data transfer server receives the data sent by the first client.

4. The integrated on-line system according to claim 1, further comprising means for permitting a client to determine the status of a data transfer recorded in said relational database through said web server means.

5. The integrated on-line system according to claim 1, wherein said data transfer protocol means further comprises:
    (a) means for permitting a client to connect to said data transfer protocol means for a send session, wherein the client transfers data to the server for transfer to a second client and the session ends;
    (b) means for permitting a client to connect to said data transfer protocol means for a receive session, wherein the client receives data from the server sent by a second client and the session ends; and
    (c) means for permitting a client to connect to said data transfer protocol means for an end-to-end session, wherein the client transfers data to the server for transfer to a second client and said data transfer server keeps the session open for an immediate response from the second client.

6. The integrated on-line system according to claim 1, wherein said data transfer protocol means further comprises means for validating a header sent by a client against information recorded in said relational database, the header including identification of a client's electronic mailbox, and means for terminating a socket connection before receiving a data transfer upon failure of the validation.

7. The integrated on-line system according to claim 1, further comprising:
   (a) a plurality of client computers connected to the network; and
   (b) client software means residing on said client computers for communicating with said data transfer server according to said enhanced data transfer protocol, said client software means including means for establishing a socket to socket connection with said data transfer server for the transfer of data according to an enhanced data transfer protocol, said client software means further including means for sending a header to said data transfer server, the header encoding a type of session requested, an identification of the client's electronic mailbox, and an optional identification of a recipient client's electronic mailbox.

8. The integrated on-line system according to claim 7, wherein said client software means is platform independent for integration into any application residing on said client computer.

9. The integrated on-line system according to claim 1, further comprising encryption means for encrypting data sent to and from said data transfer server.

10. The integrated on-line system according to claim 1, further comprising:
    (a) data encryption means for encrypting data based upon a data key; and
    (b) header encryption means for encrypting header data based upon a header key, the header data including the data key.

11. The integrated on-line system according to claim 10, further comprising means for changing the header key from session to session, including means for initializing and re-initializing the header key.

12. A computerized method for enchanced data transfer between a plurality of clients through a data transfer server in a TCP/IP network, comprising the steps of:
    (a) providing the server with a web server and a relational database;
    (b) registering a plurality of trading partners as clients through said web server, including establishing an electronic mailbox, assigning a unique mailbox ID, and a password for each client and recording the mailbox ID and password in said relational database;
    (c) listening for a client on a port dedicated to providing enhanced data transfer service;
    (d) receiving a header from a client, the header containing at least the client's mailbox ID and password and a session request;
    (e) validating the mailbox ID and password against said relational database;
    (f) creating a socket to socket connection with the client upon validating the mailbox ID and password;
    (g) when the session request is for receiving at least one data transfer, transferring the data to the client and recording the transfer in said relational database;
    (h) when the session request is for sending at least one data transfer, receiving a data transfer including a header, the header having a receiving client's mailbox ID;
    (i) sending the client an acknowledgement that the server has received the data transfer;
    (k) determining whether the receiving client is currently connected to the server, and if so, notifying the receiving client of a pending data transfer and transferring the data to the receiving client immediately and before disconnecting with the receiving client;
    (l) saving the data transfer in the receiving client's mailbox when the receiving client is not currently connected to the server;
    (m) recording the server's receipt of the data transfer, the server's transfer of data to a receiving client, and the server's mailbox storing of a data transfer in said relational database; and
    (n) terminating the socket to socket connection with the client.

13. The method according to claim 12, further comprising the step of permitting a client to query said relational database through said web server concerning status of data transfers to and from the client.

14. The method according to claim 12, further comprising the steps of notifying the receiving client that a response is requested, keeping the socket to socket connection open pending a response, and transferring a response to the client when an end-to-end session is requested.

15. The method according to claim 12, further comprising the steps of:
    (a) prior to step (d), negotiating a header encryption key between client and server;
    (b) before step (e), decrypting the header using the header encryption key, the header further comprising an encrypted portion having a second header encryption key for use in a client's next session, and when the session request is for a sending session, an encrypted data key for transfer to a receiving client.

16. The method according to claim 15, further comprising the step of transmitting an encrypted header containing the data key for decrypting the data transfer prior to transferring the data in step (g).

17. A computerized method for transferring encrypted data between a sending client, a receiving client, and a server in a TCP/IP network, comprising the steps of:
    (a) negotiating a sender's initial header key between the sending client and the server;
    (b) negotiating a receiver's initial header key between the receiving client and the server;
    (c) the server receiving a header from a sending client having header data encrypted based upon the sender's header key, the header data having a data key;
    (d) the server decrypting the header and transmitting an acknowledgement to the sending client;
    (e) the server receiving a data transfer from the sending client, the data transfer being encrypted based upon the data key;
    (f) the server transmitting a second header to the receiving client, the second header having header data encrypted based upon the receiver's header key, the header data having the data key; and
    (g) the server transmitting the data transfer to the receiving client, the data transfer being encrypted based upon the data key whereby the data key is passed from the sending client to the server encrypted by the sending client's header key and from the server to the receiving client encrypted by the receiving client's header key, the data encrypted by the data key being transferred from the sending client to the receiving client without decryption by the server.

18. The method according to claim 17, further comprising the step of updating the sending client' header key, the sending client encoding a new header key in the encrypted header data received by the server in step (c).

* * * * *